United States Patent [19]
Guarnaschelli

[11] 3,820,008
[45] June 25, 1974

[54] DRIVING CIRCUIT FOR SWITCHING TRANSISTOR

[75] Inventor: Gianpiero Guarnaschelli, Milan, Italy

[73] Assignee: Honeywell Information Systems Italia, Caluso, Italy

[22] Filed: Dec. 26, 1972

[21] Appl. No.: 317,896

[30] Foreign Application Priority Data
Dec. 29, 1971 Italy .................. 33064/71

[52] U.S. Cl. .................. 323/17, 307/240, 307/246, 307/253, 323/DIG. 1
[51] Int. Cl. .................. H03k 17/04, H02m 3/32
[58] Field of Search ........ 307/240, 246, 247 R, 253, 307/297; 317/DIG. 6; 321/2; 323/17, 38, DIG. 1

[56] References Cited
UNITED STATES PATENTS

| | | | |
|---|---|---|---|
| 3,289,040 | 11/1966 | Pfau et al. ................ | 307/253 X |
| 3,350,572 | 10/1967 | Morgan ..................... | 307/240 |
| 3,492,503 | 1/1970 | Bose ........................... | 307/253 X |
| 3,600,667 | 8/1971 | Wynn .......................... | 323/DIG. 1 |
| 3,610,963 | 10/1971 | Higgins ...................... | 307/253 X |
| 3,641,267 | 2/1972 | Cavallari ..................... | 323/DIG. 1 |

OTHER PUBLICATIONS

W. C. Leung, "Power Transistor Switch" IBM Technical Disclosure Bulletin, Vol. 11, No. 2, July, 1968, pg. 210.

*Primary Examiner*—A. D. Pellinen
*Attorney, Agent, or Firm*—Aubrej C. Brine

[57] ABSTRACT

A circuit for controlling a floating voltage switch device employing a pulse transformer with separate primary, auxiliary and secondary windings. The windings are controlled by other portions of the circuit in such a way that when a current is supplied to the primary winding, the auxiliary winding is interrupted and vice versa. The circuit also includes a pair of series connected diodes which are in parallel with the auxiliary winding so as to permit the same to be fed only during a specified time interval.

3 Claims, 1 Drawing Figure

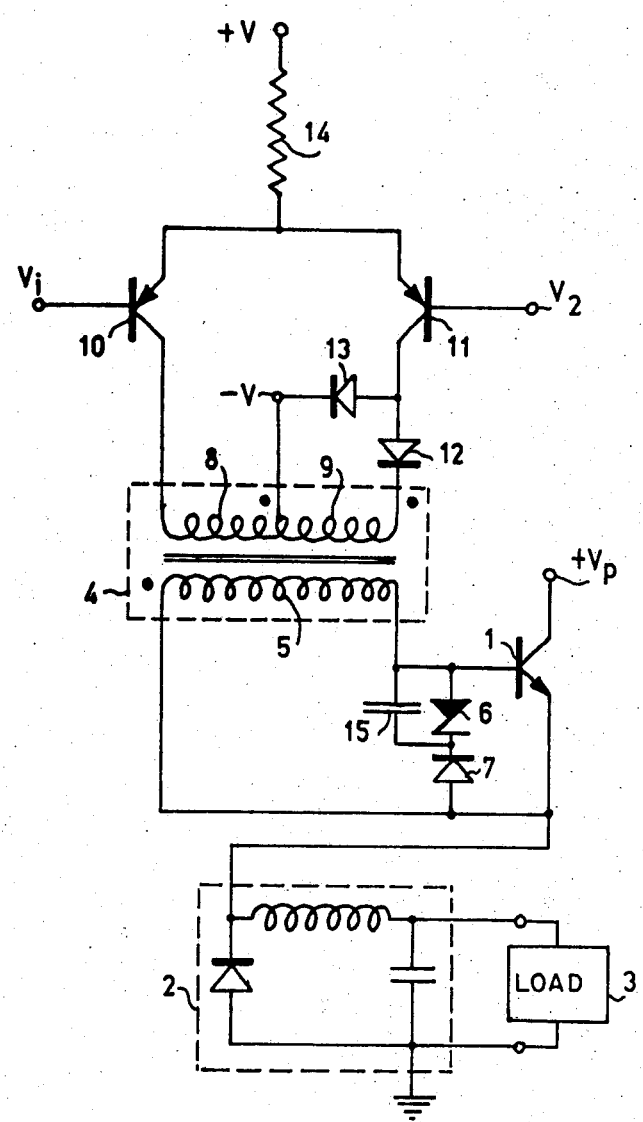

DRIVING CIRCUIT FOR SWITCHING TRANSISTOR

BACKGROUND OF THE INVENTION

The present invention relates to a transformer driving circuit for a floating-voltage switch device, such as those employed in driving circuits for magnetic memories, or in switching devices for on-off voltage regulators. In particular, the invention is directed to driving circuits for voltage regulator switches.

Voltage regulating devices are known, wherein a non regulated d.c. voltage, having a value exceeding the required regulated voltage, is applied by means of a controlled switch to a smoothing filter network comprising an inductance and a capacitance. A comparison circuit compares the output voltage to a fixed reference value and provides an error signal which is applied to a circuit controlling the switch. Usually, the switching transistor is operated outside the active condition, that is, it is controlled in such a way, to pass from the blocking (Off) condition to the saturated (On) condition and vice versa very rapidly in order to increase the efficiency of the apparatus and to reduce the energy dissipated by the transistor. The regulation of the voltage may be obtained by two different methods; that is, a frequency-variation method and a time-rate variation method.

By the first method, the switching transistor is brought to the On condition during time intervals of constant and definite length, at a frequency which varies inversely with respect to the output voltage. If this voltage is equal to or greater than the required voltage, the transistor is turned On, thus transferring energy to the filtering network, at a low or even null frequency, so that the energy drawn by the load reduces the voltage at the filter output. If the output voltage is lower than the required voltage, the frequency at which the transistor is switched On increases, thus increasing the power transferred to the filter. As the On interval is fixed, the change in frequency causes a change in the duty cycle (that is of the rate of the conducting interval) relative to the whole operation period. The power transferred to the filter at each period is proportional to the duty cycle. This method of regulation has the drawback that the filtering network must be designed so as to account for a lower possible frequency due to the variation output voltage admitted during a period. This means that relatively big capacitors and inductors, should be used, which are costly and bulky. Therefore the time-rate system is often preferred, in which the inductors and capacitors of the filter are designed for a constant operating frequency, which may be chosen as the highest compatible with the required performance of the switching transistor. By this system the change in the duty cycle is obtained by changing, in each period, the rate of the On interval to the rate of the whole period, at constant frequency.

Attention must be drawn to the fact that, for such regulation apparatus, the switching transistor is usually series connected to a leg of the feeding network and a leg of the filter, which is not clamped to a fixed reference voltage, and is, therefore, at a floating potential. Both collector and emitter are therefore submitted to a variable potential, and the base must therefore be controlled by a circuit unaffected by changes of such potential. As the control circuits of the transistors are usually fed by voltage referenced to a fixed ground voltage, these circuits must be insulated with respect to the transistor base, and the driving must be by means of a pulse transformer.

This driving method has the drawback that the variation range of the duty cycle is necessarily reduced if the regulation is obtained by constant frequency and variable duty cycle. In fact, the minority charges, stored in the transistor base during the On condition, must be rapidly removed to allow the transistor to go over quickly to the Off condition. This is accomplished by suitably proportioning the driving transformer, which has its secondary connected between the base and the emitter. Choosing a transformer having a magnetizing inductance suitably low with espect to the equivalent resistance of both the transformer windings and the load, the voltage which will appear across the secondary terminals (as a consequence of a rectangular voltage pulse having been applied to the primary winding) will be such as to not reproduce the shape of the pulse, but rather decrease exponentially with respect to time.

The secondary winding therefore supplies a first direct voltage pulse, of duration equal to that of the primary pulse, but decreasing with time, and a second inverted voltage pulse, having an initial amplitude equal to the voltage drop of the direct pulse, and decreasing also exponentially. In addition, ripples superimposed on these exponential curves are caused by the stray capacitances of the transformer however, these are irrelevant for the following description.

For a more thorough discussion of pulse transformers reference may be had to several electronics textbooks, of which one widely known book would be "Pulse Digital and Switching Waveforms" by Jacob Tillmann and Herbert Taub, published by McCraw-Hill, New York 1965 (Chapter 3, pages 64–82). It may be remarked, that the inverse voltage pulse following the direct pulse removes the minority charges stored within the transistor base, which thus favors a prompt return to its Off condition. However, in order to have an adequate effect, the inverse pulse must be of substantial value, so that the voltage drop of the primary pulse will also be substantial. On the other hand, the voltage drop must not reduce the voltage of the direct pulse to less than the minimum value required for maintaining the transistor On. Since the voltage drop depends on the pulse duration, it is clear that this duration cannot exceed a predetermined value, and therefore the range in which the duty cycle may vary is severely limited by these considerations.

The driving circuit according to the present invention obviates such inconveniences by permitting a quick removal of the stored minority charges without requiring a critical design of the driving transformer, and by providing a very large variability of the duty cycle which extends from a minimum substantially null to a maximum very close to 90 percent. In addition, it provides the quick removal of the minority charges by means of a circuit branch which is automatically switched on when required and switched off as soon as its task is completed, without the need for any additional timing circuits or similar device.

SUMMARY OF THE INVENTION

Essentially the circuit according to the invention employs a driving transformer having a very high magnetizing inductance. The driving transformer is provided with an auxiliary winding, and a differential circuit for controlling the auxiliary winding and the primary winding as well. The windings are controlled in such a way that when a current is supplied to the primary winding the auxiliary winding is interrupted, and vice versa. The driving circuit is completed by a pair of diodes suitably connected to the auxiliary winding. This permits the same to be fed for the required time interval only.

BRIEF DESCRIPTION OF THE DRAWINGS

These and other features and advantages of the invention will clearly appear from a detailed description of a preferred embodiment thereof, with reference to the attached drawing in which the FIGURE shows a preferred embodiment of the driving circuit according to the invention.

DESCRIPTION OF THE PREFERRED EMBODIMENT

The power switching transistor which is employed for the regulation is indicated by the reference numeral 1. It may for instance be of the NPN type, having the collector connected to the positive terminal of a non regulated d.c. voltage source $+V_p$ and the emitter connected to the input lead of the inductance — capacitance filter 2. A load 3 is connected at the output of the filter 2. The feeding circuit is of course completed by a common ground connection.

Transistor 1 is controlled by means of the pulse transformer 4 which is provided with a secondary winding 5 having its terminals respectively connected to the base and to the emitter of transistor 1. A Zener diode 6 and a diode 7 are series connected across the base-emitter junction with the forward direction of the two diodes being opposed. The current will therefore only flow in the secondary when the voltage between the terminals is higher than the Zener voltage of diode 6 as it is increased by the forward voltage drop of the diode 7. The operation of these diodes will be explained later on.

The terminals of the primary winding 8 are respectively connected to a negative voltage source $-V$, for instance $-5$ V, and to the collector of a control transistor 10. The pulse transformer is additionally provided with an auxiliary winding 9 having its terminals respectively connected to the voltage source $-V$ and to the collector of a second transistor 11 through a diode 12. The forward direction of the diode 12 is from the collector of the transistor 11 to the terminal of the auxiliary winding.

A diode 13 is connected across the collector of the transistor 11 and the voltage source $-V$, its forward direction going from the collector to the voltage source. In the described example the transistors 10 and 11 are of the PNP type, and have their emitters commonly connected to a voltage source $+V$ (for instance +5V, through a resistor 14). They form a known type of current switching circuit wherein either the transistor 10 or the transistor 11 is conducting (whereas the other one is non-conducting) depending on which one of the voltages applied to the base of the transistors is higher.

A control voltage $V_i$ is applied to the base of the transistor 10 which may assume either one of two different levels, a low one, between 0 and 0.4V and a high one, between 2.8 and 5 V. On the other hand a constant reference voltage $V_2$ is applied to the base of the transistor 11. The voltage $V_2$ is between the two indicated levels of $V_i$ for instance 1.5 V. Therefore when the voltage level which is applied to the base of the transistor 10 is low (for instance 0 V) the transistor 10 is conducting, and a current flows through the resistor 14, causing a voltage drop therein. This brings both emitters of the transistors to a potential of approximately 0.7 V which is substantially equal to the voltage drop across the base-emitter junction of the transistor 10. The transistor 11 is Off because its emitter-base junction is back biased.

It may be noted that the emitter current of the transistor 10 is constant. The collector current, which is equal to the emitter current minus the base current, may also be considered as being constant, as long as the collector load has a sufficiently low impedance so as to prevent a forward biasing of the base-collector junction. Under these conditions the circuit operates as a constant current generator, with respect to both the emitter current and the collector current.

When the voltage level which is applied to the base of the transistor 10 is high, (for instance 2.8 V) the transistor 11 is On and the transistor 10 is Off. The current flowing through the resistor 14 brings the emitters to a potential close to $V_2 + 0.7$ V (which is, in this example 2.2. V). The emitter-base junction of transistor 10 is back biased. In this case the transistor 11, and resistor 14 operate as a constant current generator.

Considering now the operation of the driving circuit for the transistor 1 as a whole, it will be assumed that the feeding voltage and the control voltage have the values previously given and that the turn rates between primary, auxiliary and secondary windings are equal to 2/2/1. In rest condition, a high voltage level is applied to the base of the transistor 10: therefore the transistor 10 is Off and the transistor 11 is On. However, the current flowing through transistor 11 does not pass through the auxiliary winding 9, but is instead drained off by the terminal $-V$ (which is set at $-5$ V) through the low-resistance, and null-inductance path of diode 13. Under these conditions, therefore, neither the primary nor the auxiliary windings are conducting current, and the transformer can be considered to be demagnetized. Since no flux variation is caused in the magnetic circuit, there is no induced voltage in the secondary winding. As a consequence, no voltage is applied to the base-emitter junction of the switching transistor 1, and the transistor 1 is therefore Off.

If a low voltage level is applied to the base of transistor 10, this transistor goes On and drives the transistor 11 Off. A current flows through the resistor 14, the transistor 10 and the primary winding 8. This current magnetizes the transformer core, and induces an e.m.f. in the secondary winding, which forward biases the base-emitter junction of transistor 1, and turns the transistor 1 On. Neglecting the magnetizing current (which is negligible) the voltages and the currents in the primary and secondary windings are respectively in inverse relationship to each other and in direct ratio to the number of respective turns of the primary and secondary windings.

The load of the secondary, is formed by the transistor 1. The transistor 1 operates as a constant voltage generator opposed to the e.m.f. caused by the transformer. This constant voltage has a value equal to the base-emitter junction of the transistor 1 (typically, for power transistors, 1 V.) whereas the internal resistance is negligible. The equivalent resistance of the transformer is also very low, and the current is therefore determined by the constant current generator formed by the resistor 14 and the transistor 10.

If $I_1$ is the current flowing through the resistor 14, the current induced into the base of transistor 1 is, with good approximation, $I_2 = 2I_1$. This current carries the transistor very rapidly to the saturation condition. The voltage across the secondary terminals is approximately 1V, and the voltage at one of the terminals of the secondary is approximately 2V. Under these conditions, the collector of the transistor 10 is at a voltage of $-3$ V.

A voltage is also induced at the terminals of the auxiliary winding 9. The sense of the winding is such, that the voltage of the terminal connected to the diode 12 is $-7$ V. However, no current can flow in the auxiliary winding, because of the diode 13 in the circuit formed by the auxiliary winding 9 and the diodes 12 and 13. With regard to the circuit formed by the voltage source $+ V$, the transistor 11, the diode 12 and the secondary winding 9 no current can flow because the transistor 11 is Off.

Transistor 1 remains in the On condition as long as the control signal that is applied to the base of transistor 10 is at a low level. It is assumed that the pulse transformer is so designed, that it will not saturate during the maximum assumed duration of the control pulses. When the control pulse is at an end, that is, when a high voltage level (for instance 2.8 V) is again applied to the base of the transistor 10, the same is driven Off and the transistor 11 is driven On. Therefore current no longer flows through the primary winding, and the current $I_2$ is no longer applied to the base of the transistor 1.

This does not mean that the transistor 1 is immediately driven Off. In order for this to happen, it is necessary that the charge stored in its base be removed. This task is accomplished by the secondary winding of the transformer. It is known that as long as the stored charge in the base of the transistor is not removed, a voltage equal to the forward voltage drop in the junction, for instance 1 V, is maintained between base and emitter. This voltage is applied to the secondary of the transformer through which an inverse base current passes. This current has a direction contrary to the prior one, and has a magnetizing effect. However this negligible magnetizing component need not be considered on the primary winding 8, its value is controlled by the currents flowing in the remaining windings. This cannot be said for the auxiliary winding 9. The magnetizing effect of the inverted base current in the transistor 1 causes an induced e.m.f. in the auxiliary winding which brings the terminal connected to the diode 12 to a potential of $-7$ V. A current circulates from this terminal to the terminal connected to the voltage source of $-5V$. As transistor 11 is now conducting, its collector is brought through diode 12 to a voltage of approximately $-6.3$ V (that is, the voltage $-7V$ increased by the forward voltage drop of the diode). The diode 13 is back biased, and a current flows through the resistor 14, the transistor 11, the diode 12 and the auxiliary winding. The value of this current is determined by the constant current generator formed by the resistor 14 and the transistor 11. This current according to the ratio of turns of the auxiliary winding to the secondary winding. This current determines the value of the inverted base current. This inverted base current has a fixed and remarkable value and causes a quick removal of the stored minority charge, and rapidly drives the transistor 1 Off.

The inverted base current, being determined by the aforementioned current generator, is constant for the time required to remove the minority charge stored in the base. This time includes not only the proper "storage time," but also the "transistion time." When the minority charges are removed, the inverted base current becomes null, and also the voltage applied to the secondary terminals goes to zero and the magnetizing current correspondingly also goes to zero. This latter occurrence induces in the windings a substantial e.m.f. which strives to maintain the magnetizing current. A high inverted voltage therefore appears across the base emitter of transistor 1. A corresponding voltage appearing in the auxiliary winding carries the terminal connected to the diode 12 towards a positive potential, thus back biasing the diode 12. The collector current of transistor 11 is therefore discharged through diode 13 and no current flows through the auxiliary winding.

If the winding terminals were not closed over convenient external loads, the magnetizing current would close over the stray capacity of the windings, thus causing rippling and energy dissipation by electric discharges. This would originate induced values of e.m.f. that would be non-acceptable by the bipolar components connected to the transformer. Even the back biasing capacity of the base-emitter junction of transistor 1, is not sufficient to limit such induced e.m.f.'s. It is therefore convenient to provide a voltage limiting circuit formed by the Zener diode 6 and the diode 7 which provides a low-resistance path for the demagnetizing current for induced voltage equalling the voltage of Zener diode 6. Consistent with the inverse voltage being admissible for the bipolar components connected to the transformer it is convenient to choose a relatively high demagnetizing voltage in order to obtain a rapid demagnetization. It is known that for a transformer to be demagnetized, it is necessary that the sum of the voltage pulses of the windings be a null. The transformer operates under a constant secondary voltage of 1 V during the magnetization phase, and under a constant voltage $V_z$ during the demagnetizing phase. This should mean $1 \cdot t_1 = V_z \cdot t_2$, where $t_1$ is substantially the conduction time of the transistor 1, and $t_2$ is the demagnetization time. The higher the demagnetizing voltage, the shorter $t_2$ will be since $t_2 = t_1/V_z$.

This permits determination of the maximum value of the duty cycle, for the switching circuit according to the invention over which the transformer is not completely demagnetized at each cycle and therefore will saturate after a time. The shortest duration of the operation cycle is equal to $t_1 + t_2$, and the maximum value of the duty cycle is therefore:

$t_1/t_1 + t_2 = t_1/t_1 + (t_1/V_z) = V_z/V_z + 1$

For $V_z = 7$ Volt, it is $V_z/ (V_z + 1) = ⅞ - 0.88$, that is a maximum duty cycle of approximately 88 percent.

It is clear that the Zener diode 6 and the diode 7, which in FIG. 1 are connected across the secondary of the transformer, may be instead connected across the primary winding without changing the operation and the efficiency of the circuit. In order to delay the high inverse voltage in such a way, that the maximum inverse voltage is applied to the transistor 1 when it has certainly ceased to conduct, a suitable capacitor 15, indicated in FIG. 1 by broken lines, may be connected in parallel to the Zener diode 6, (but not to the diode 7).

It is self evident that a number of changes and modifications may be carried out without departing from the spirit and scope of the invention. For instance, mutually exchanging the voltage sources + V and —V, the direction of conduction of diodes 12 and 13 are inverted, and, by using transistors 10 and 11 of the NPN type instead of the PNP type, the operation of the circuit is not changed. Also the transistor 1 may be of the PNP type instead of the NPN type, without causing substantial changes in the operation outside the spirit and scope of the invention.

What is claimed is:

1. A circuit for controlling the flow of current in a load comprising in combination:

a switching transistor controlling the flow of the current in the load;

a current switching circuit for switching a current either in a first or in a second leg, in response to external signals, said first leg being formed by the collector emitter path of a first transistor, said second leg being formed by the collector emitter path of a second transistor, the base of said first transistor being fed by said external signal, the base of said second transistor being connected to a reference voltage;

a pulse transformer, including a primary winding, a secondary winding and an auxiliary winding, the primary and the auxiliary windings having a first terminal connected together, the second terminal of said primary winding being connected to said first transistor, the second terminal of said auxiliary winding being connected to said second transistor through a first diode;

the secondary winding being connected between the emitter and the base of said switching transistor;

and a second diode connected between said first terminal of said primary and auxiliary windings and a point common to said second transistor and said first diode.

2. The circuit of claim 1 further comprising, in combination, a Zener diode and an ordinary diode series connected across one of said windings so as to limit the inverse voltage applied between the base and the emitter of said switching transistor.

3. The circuit of claim 2 further comprising a capacitor connected in parallel to said Zener diode.

* * * * *